(12) United States Patent
Chandrasekhar et al.

(10) Patent No.: US 9,348,678 B1
(45) Date of Patent: May 24, 2016

(54) PARTITIONED APPLICATION ENVIRONMENT

(71) Applicant: MOBILE IRON, INC., Mountain View, CA (US)

(72) Inventors: Aaditya Chandrasekhar, San Francisco, CA (US); Maksim Orlovich, Los Gatos, CA (US); Rama Rao Yalamanchili, San Francisco, CA (US); Lawrence Lee, San Jose, CA (US); Jack Wu, Palo Alto, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

(21) Appl. No.: 13/922,077

(22) Filed: Jun. 19, 2013

Related U.S. Application Data

(60) Provisional application No. 61/662,162, filed on Jun. 20, 2012.

(51) Int. Cl.
*G06F 9/54* (2006.01)

(52) U.S. Cl.
CPC ........................................ *G06F 9/547* (2013.01)

(58) Field of Classification Search
CPC ...... G06F 9/5077; G06F 2009/4557; G06F 9/547
See application file for complete search history.

(56) References Cited

U.S. PATENT DOCUMENTS

| | | | |
|---|---|---|---|
| 6,430,570 B1 * | 8/2002 | Judge et al. .................... | 717/166 |
| 2003/0070005 A1 * | 4/2003 | Mukundan et al. ........... | 709/330 |
| 2010/0199281 A1 * | 8/2010 | Kettley et al. ................. | 718/102 |
| 2011/0320520 A1 * | 12/2011 | Jain ............................... | 709/203 |
| 2012/0102098 A1 * | 4/2012 | Guillou et al. ................ | 709/203 |
| 2012/0331532 A1 * | 12/2012 | Walters et al. .................... | 726/5 |
| 2013/0159997 A1 * | 6/2013 | Cawlfield et al. ................ | 718/1 |

* cited by examiner

*Primary Examiner* — Syed Roni
(74) *Attorney, Agent, or Firm* — Van Pelt, Yi & James LLP

(57) ABSTRACT

A partitioned application environment is disclosed. In various embodiments, a request associated with an application environment in which an application is running is received from the application. A determination is made to fulfill the request at least in part via a call to a node at which application code associated with the application is running in an application environment partition provided at the node. A call associated with the request is sent to the node, based at least in part on the determination.

31 Claims, 14 Drawing Sheets

PARTITIONED APPLICATION ENVIRONMENT

CROSS REFERENCE TO OTHER APPLICATIONS

This application claims priority to U.S. Provisional Patent Application No. 61/662,162 entitled LOAD BALANCING OF A VIRTUALIZED, PARTITIONED APPLICATION ENVIRONMENT AND ITS ADMINISTRATION VIA A MANAGEMENT CONSOLE filed Jun. 20, 2012 which is incorporated herein by reference for all purposes.

BACKGROUND OF THE INVENTION

The most common way in which an end-user interacts with a computing device is through applications. Applications are packaged into application binaries, which are serialized representations of the application's programming logic. Operating systems (OSs) provide an application environment (AE), or a set of AEs, one of which is used when the end-user instructs the OS to launch an application binary. The choice of which AE to use and how to deploy the application binary within it is usually the task of a specialized OS component called a loader.

The loader, on instruction from the OS, will attempt to retrieve the application binary from one of the OS services that manages serialized media. Typical serialized media can be physical storage devices (eg: floppy disks, hard drives, ROMs, CDROMs, etc.), networked components and services (eg: network storage, application stores, etc.) or local system non-persistent resources such as main memory (eg: RAM) and other form of caches. The loader then attempts to deserialize the application binary into a storage area designated for execution by the OS. This storage area is typically called a process and is budgeted a set of resources (eg: virtual address space, CPU time, etc.) by the OS. On a successful deserialization operation by the loader and execution of the process by the OS, the application binary becomes an application that is evident to the end-user.

Once an application has been started, it will attempt to consume resources provisioned to it by the OS. Certain resources are privileged and cannot be directly consumed by the application, as they fall under the authority of the OS or a delegated authority (DA) of the OS. An example of such resource ownership is the Graphical User Interface (GUI) subsystem, which typically is managed by an application, called the Window Manager (WM) in the Microsoft Windows™ OS, and is appointed by the OS as the DA for GUIs. In order to use these types of resources, an application must interact with the owning DA, WM in the case of GUI resources, via an OS gateway known as the Application Programming Interface (API). This gateway provides a fundamental abstraction for the OS and DA to manage and arbitrate privileged resources.

The set of resources available to be used by an application, which typically includes both resources that can be consumed directly and those accessed via APIs, is termed as the Application Environment (AE). A compatible AE is fundamental to running any application on a given OS.

Application Environments (AE) have been virtualized in two ways. In one approach, of the host operating system (OS) that provides the specified AE is virtualized. This is typically done with a system hypervisor that uses a combination of hardware and software to replicate the physical machine specification for the OS into a virtual machine. Note that there are at least two OS instances running concurrently in this model. In a second approach, emulation is used to translate the specified AE into that of another which uses a different OS. Note that there are no virtual machines in this model and only one OS is running.

BRIEF DESCRIPTION OF THE DRAWINGS

Various embodiments of the invention are disclosed in the following detailed description and the accompanying drawings.

DETAILED DESCRIPTION

Figure 1A:
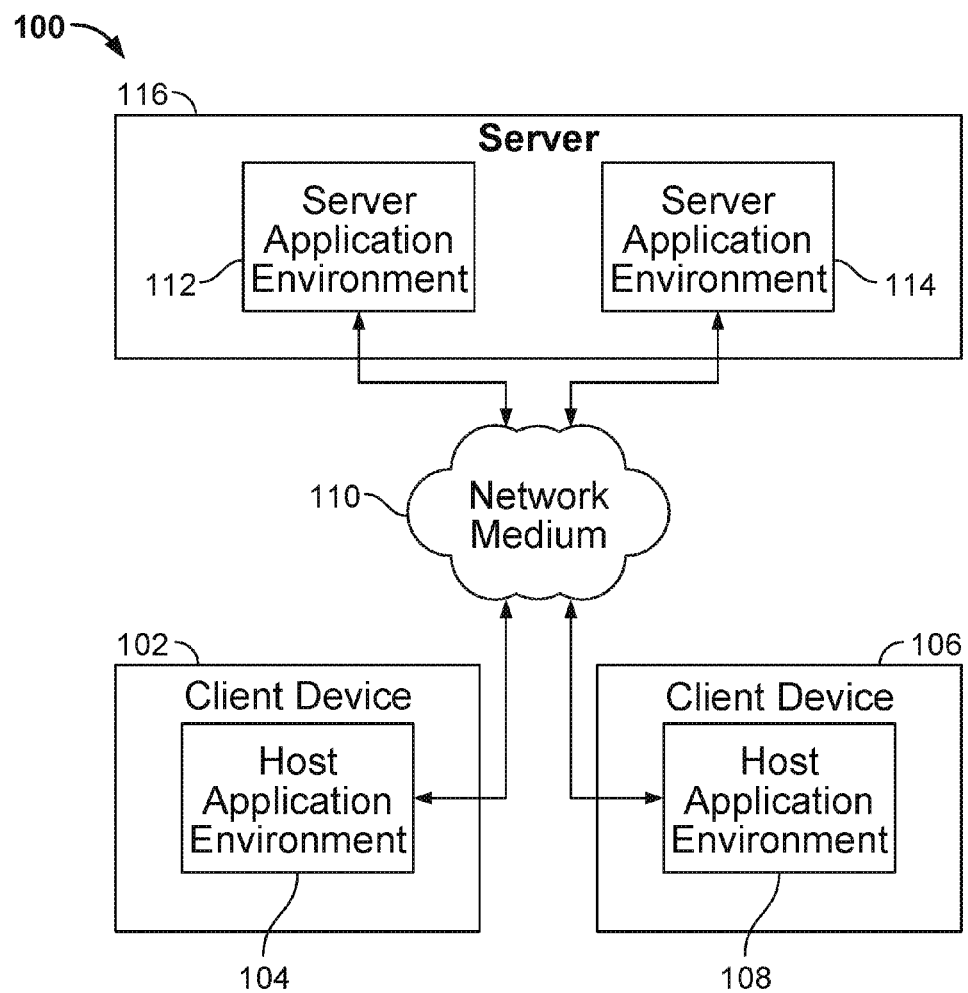
FIG. 1A is a block diagram illustrating an embodiment of a system in which two AEs communicate to two different client host OS AEs through a network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A partitioned application environment (AE) is disclosed. In various embodiments, an AE is split (partitioned), effectively, into two or more AEs, which are used in coordination to provide access to an application, and the functionality the application embodies, to an end user of the application.

In various embodiments, a logically partitioned AE that enables compute workloads of a contained application to be distributed across various logical and physical entities is disclosed. In various embodiments, the partitioned environment may span a plurality of networked computing nodes and a plurality of Operating Systems each deployed on a unique computing node.

For example, an AE may in some embodiments be split into two (sometimes herein designated as $AE_\rho$ and $AE_\phi$, for example), one of which executes in the intended host OS ($AE_\rho$), e.g., an app written by an app developer for mobile devices having a particular OS, and the other which executes in, by way of example but not limited to, a server OS ($AE_\phi$). Each split AE may be run either within a virtual machine or on a physical machine. In yet another example, an AE can be split into two ($AE_\rho$ and $AE_\phi$, for example), where a first application environment $AE_\rho$ executes on the host OS but related application environments used to provide the application ($AE_\phi$) could be split into further AEs, such as $AE_\phi(0)$ to $AE_\phi(n)$, and cumulatively all these AE's still function to provide one application. The execution of the AEs, e.g. the split AEs, in a controlled and coordinated manner provide the environment, under which application binaries may be deployed.

FIG. 1A is a block diagram illustrating an embodiment of a system in which two AEs communicate to two different client host OS AEs through a network. In the example shown, the system 100 includes a client device 102 with a host application environment (AE) 104 and a client device 106 with a host AE 108 connected via a network medium 110, such as a mobile network, the Internet, etc., with server AEs 112 and 114 on a remote server 116. In various embodiments, an application binary may be available on client devices 102 and 106 and remote server 116, and execution of the application binary on client devices 102 and 106 and server 116 may be coordinated, for example to cause certain use of resources by the application, through calls to or otherwise associated the respective AEs 104, 108, 112, and 114, for example, to be realized either on the client device (102 or 106) or the server 116, depending for example on considerations such as security, speed, resource availability, etc.

Figure 1B:
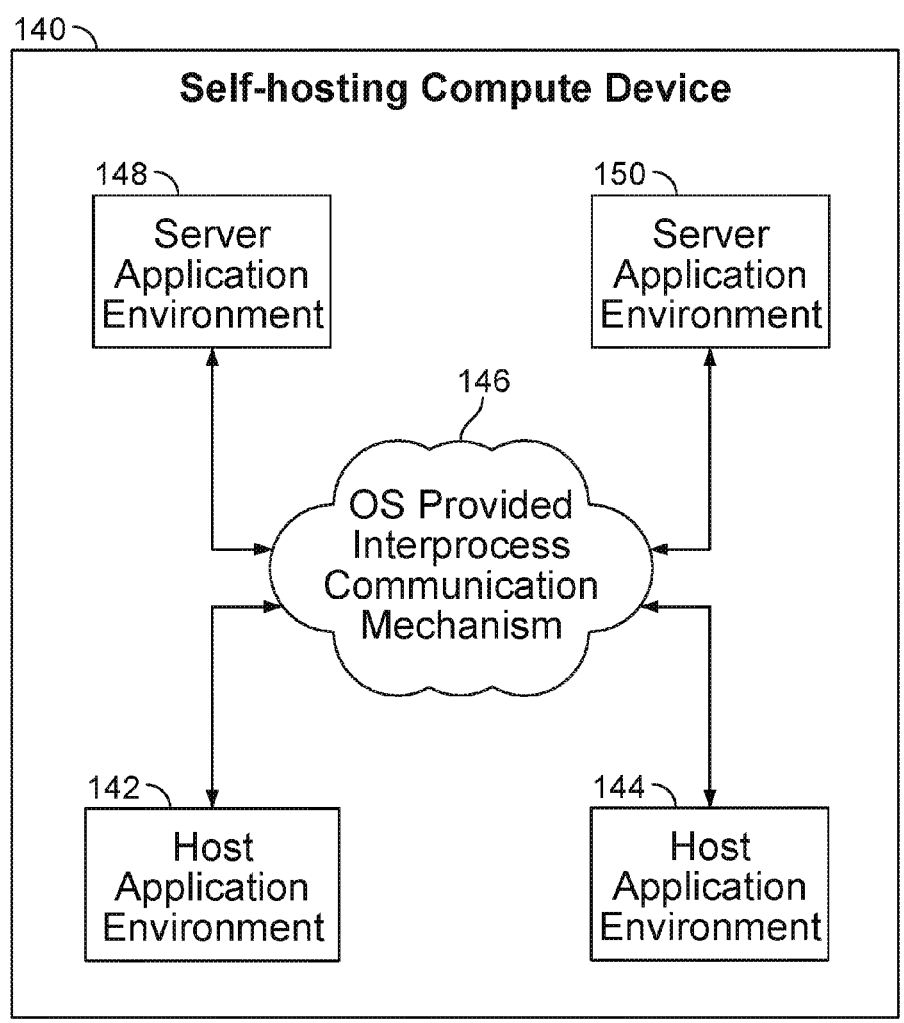
FIG. 1B is a block diagram illustrating an embodiment of a system in which two server AEs communicate with two different host AEs running on the same compute device instance.

FIG. 1B is a block diagram illustrating an embodiment of a system in which two server AEs communicate with two different host AEs running on the same compute device instance. In the example shown, host AEs 142 and 144 communicate via an OS provided inter-process communication mechanism 146 with server AEs 148 and 150.

Figure 2A:
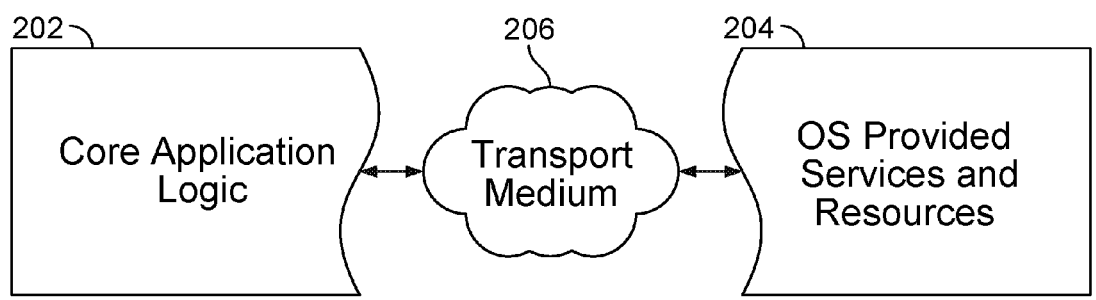
FIG. 2A is a block diagram illustrating an embodiment of an application that has been split between two AEs interconnected via a network.

FIG. 2A is a block diagram illustrating an embodiment of an application that has been split between two AEs interconnected via a network. In the example shown, the application has been split into a core application logic portion 202 running in a first AE and a second application portion 204, running in a second AE, which uses OS provided services and resources, for example to provide a graphical or other user interface. The first and second AEs are connected by a transport medium 206, e.g., a network, and communications are sent between the two as needed to use the first and second AEs to provide a single, homogeneous AE to the application.

Figure 2B:
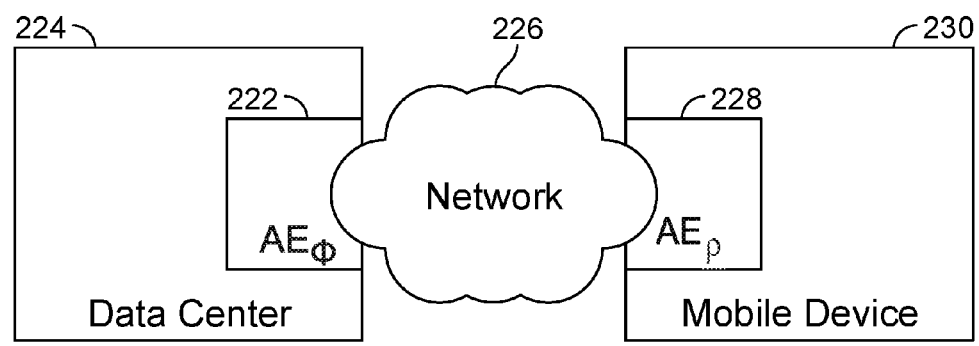
FIG. 2B is a block diagram illustrating an embodiment of a system in which a mobile application has been split between a mobile device and a data center.

FIG. 2B is a block diagram illustrating an embodiment of a system in which a mobile application has been split between a mobile device and a data center. In the example shown, a server AE 222 provided on a data center server 224 is connected via a network 226 with a host AE 228 provided on a mobile device 230. In various embodiments, a mobile application desired to be used by a user of the mobile device 230 results in the same application binary executing in both host AE 228, which may be a native AE associated with an OS of the mobile device 230 and for which the mobile application was developed, and AE 222. In various embodiments, for example, application data may for security or other purposes reside at the data center 224 and may not (necessarily) be sent to and/or processed at the mobile device 230. Instead, the application code may operate on such data remotely at the data center 224, with resulting consequences being made available only as needed at the mobile device 230, for example by providing a graphical user interface or other display that reflects a result of such processing at the data center 224. In various embodiments, communications between the AEs 222 and 228 reflect application level intent and/or semantics. For example, rather than sending to the mobile device a bitmap of a page to be displayed at the device, in some embodiments a result of processing at the data center 224 may be caused to be displayed at the mobile device 230 by sending, for example, the information to be displayed, along with application level instructions to create and display a window and to populate the window with the information, user interface controls or widgets, etc. In various embodiments, the application level intent and/or semantics are communicated by, for example, remote procedure calls (RPC), inter-process communications, or other communications. The application code and AE on the mobile device side in various embodiments use instructions and information received from an associated remote AE, such as AE 222 of FIG. 2B, to invoke OS provided services and resources of the mobile device 230 to generate and provide the desired display. In this way, a native user experience may be provided at the mobile device 230, and more timely updated, than would be possible if a new bitmap had to be communicated from the data center 224 to the mobile device 230 every time the application desired to update the display at the mobile device 230, based for example on user interactions, such as scrolling, entry of keystrokes (e.g., to display characters as typed, or to provide an audible "click" as keys are struck, etc.).

In the examples shown in FIGS. 2A and 2B, the AE has been split between two or more AEs, each of which is designated a specific role. In other embodiments, the division of work across AEs may be determined dynamically, for example based on dynamic determinations of resource availability, current workload, current capacity, etc. In either approach, to an Application deployed within this AE set, the AE set appears as a singular, homogeneous AE, no different from that for which the Application was originally designed for.

By way of example, consider an application designed for the Microsoft® Windows™ OS. A typical application for this OS is written using the Win32™ API and the C++ programming language. At its simplest form an application written for the Win32™ API involves initializing its own internal state, services and data structures and then interfacing with the Win User function set provided by the Win32™ API to construct Windowing objects. The sequence for creating a trivial window is by invoking the RegisterClassEx routine followed by a CreateWindow and ShowWindow routine. This allows the application to instruct the WM to allocate internal data structures to track the newly created window, create a visual object for the computer screen and display it.

This Application may be run in an AE that is split along the API interface boundary. The API interface boundary is an example of one possible split point that can be used to divide an AE. For the purposes of illustration the above example of a Win32™ Application can be split along the Dynamic Link Library (DLL) boundary to produce the an AE that can run on the server ($AE_\phi$) using any OS and a corresponding AE that talks to the Microsoft® Windows™ OS instance ($AE_\rho$). Communication between the two AEs can be facilitated by using standard Inter Process Communication (IPC—see FIG. 1B), Remote Procedure Calls (RPC—see FIG. 1A) or any other service, which provides a logical connection and preserves the illusion to the application of a homogeneous Win32™ API AE.

Figure 3A:
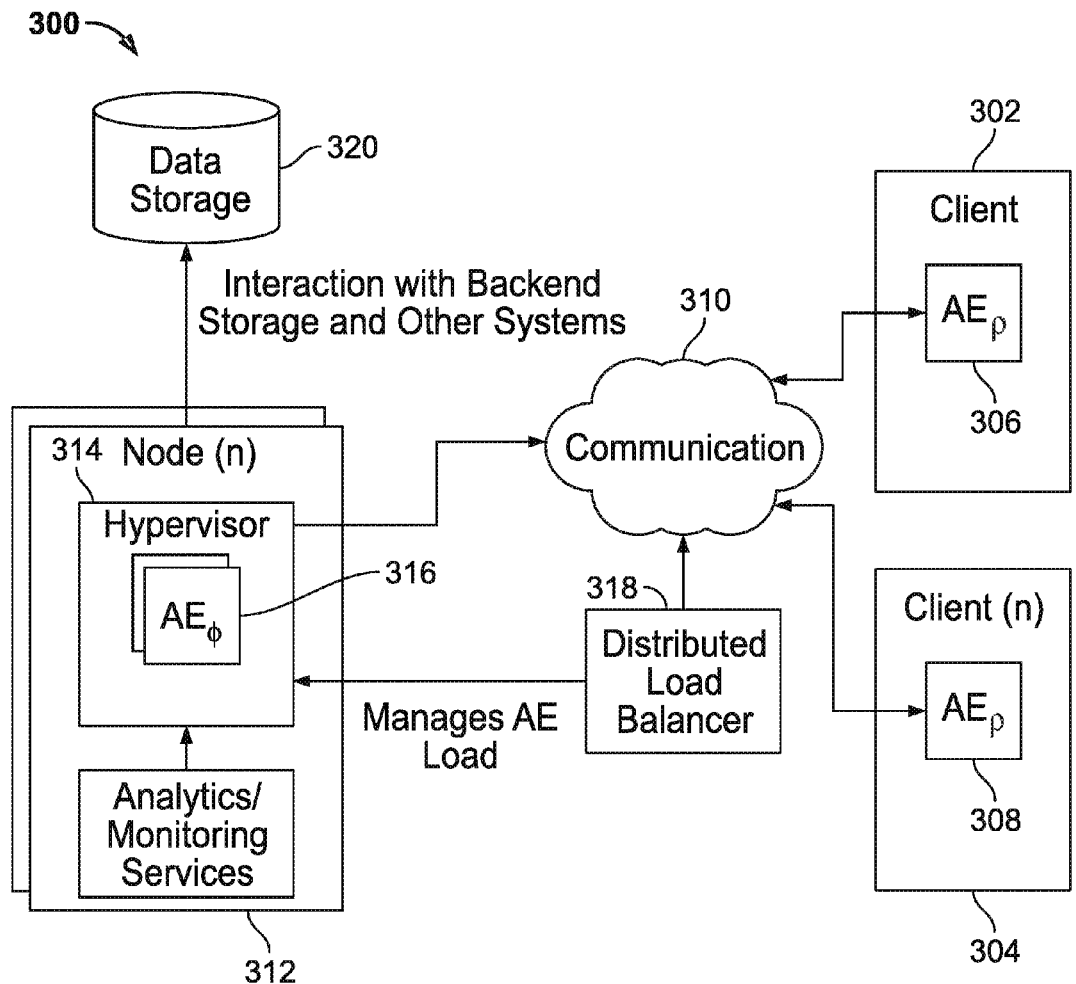
FIG. 3A is a block diagram illustrating an embodiment of a partitioned application environment.

FIG. 3A is a block diagram illustrating an embodiment of a partitioned application environment. In the example shown, the system 300 includes a plurality of client devices, represented in FIG. 3A by clients 302 and 304, having client-side (host) AE's 306 and 308, respectively. The client devices 302, 304 communicate via a communication network 310, such as a mobile or other telecommunication network, the Internet, etc., with a plurality of processing nodes represented in FIG. 3A by node 312. Each node includes an application hypervisor 314 configured to provide and support one or more server-side AEs 316. In some embodiments, the application hypervisor 314 may emulate an OS, or one or more API's thereof, to provide the AEs 316. In various embodiments, the application hypervisor 314 may coordinate application instances running in AEs 316 each with one or more corresponding application instances running in AEs such as 306 and 308 on client devices 302 and 304, respectively, such as being making determinations as the need arises as to which application resource or other requests are to be performed remotely (from the node 312), e.g., an associated client device such as 302 or 304.

In various embodiments, the remote AEs ($AE_\phi$) in the AE set can be intelligently placed across nodes in a network in order to address various use cases. For example, in order to preserve a native user experience, the set of function calls in an API that constitute GUI functionality can be bundled into an AE that can be placed in close proximity to the end-user. This is illustrated by FIG. 3A where the client provides ($AE_\rho$) and the server provides ($AE_\phi$). Depending on various policy decisions, such as but not limited to, security, network bandwidth consumption, etc., the Distributed Load Balancer (DLB) 318 may decide to position an AE at different points in a network topology. The decision to position an AE at any network location can be either a static decision (immutable after the user launches the application) or dynamic (based on a set of variables and circumstances that occur when the application is running).

In the example shown in FIG. 3A, application data may be stored in data storage 320 associated with nodes represented by node 312. Data may be accessed, for example, by an application instance executing in AE 316, and results of the processing thereof may be caused to be displayed to an associated end user of a client device such as client device 302 or client device 304.

In various embodiments and examples described herein an application is partitioned to have a first application partition realized on a server side application environment and a second application partition realized on a corresponding client side application environment. For example, a user interface and other user experience related aspects of the application may be realized by application code running in a client side application environment while backend processing, data access from an external or other data storage system, etc. may be performed by application code running in a corresponding server side application environment. However, in various embodiments, using techniques disclosed herein an application may be partitioned across any two or more nodes, with various corresponding application partitions being realized on the respective nodes by application code running in an associated application environment on that node.

Figure 3B:
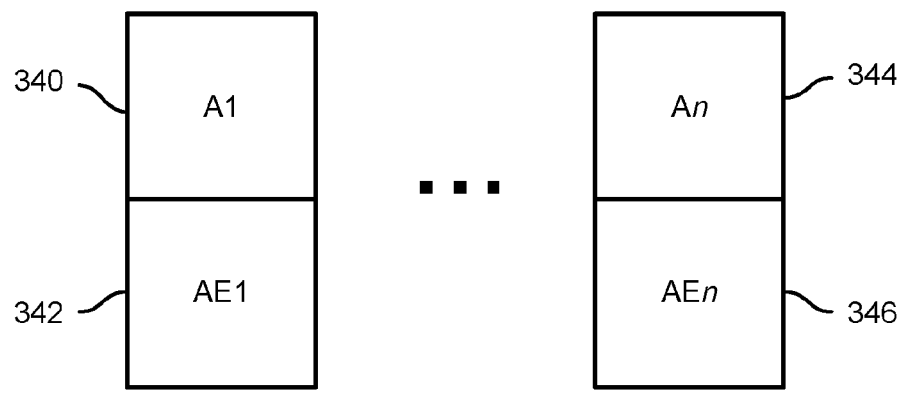
FIG. 3B is a block diagram illustrating an embodiment of a partitioned application environment.

FIG. 3B is a block diagram illustrating an embodiment of a partitioned application environment. In the example shown, an application "A" has been partitioned into a plurality of partitions A1 to An, represented in FIG. 3B by a first application partition 340 running on a first application environment 342 and an n-th partition 344 running on an n-th application environment 346. In various embodiments, an application and its associated functionality and processing may be split across any arbitrary number of partitions, using techniques described herein. In various embodiments, further and/or different partitions may be integrated dynamically, for example based on factors such as increased demands on the application instance, resource limitations at one or more nodes currently hosting one or more existing partitions, etc. In some embodiments, application partitioning may be performed based at least in part on one or more application developer and/or user specified partitioning policies. For example, a partitioning policy may provide that if a certain resource usage and/or availability threshold is reached, an additional partitioning of the application, in a manner specified in the policy in some embodiments, should be performed. For example, if a first server is performing data access and backend processing for an application running in an environment that has been split between the server and a remote client, while a user experience of the application is being realized at the client, if conditions specified in a policy are met a further partitioning to separate the data access activities of the application from the backend processing aspects may be performed, for example to offload one or the other to a further application environment partition provided at a second server.

Figure 3C:
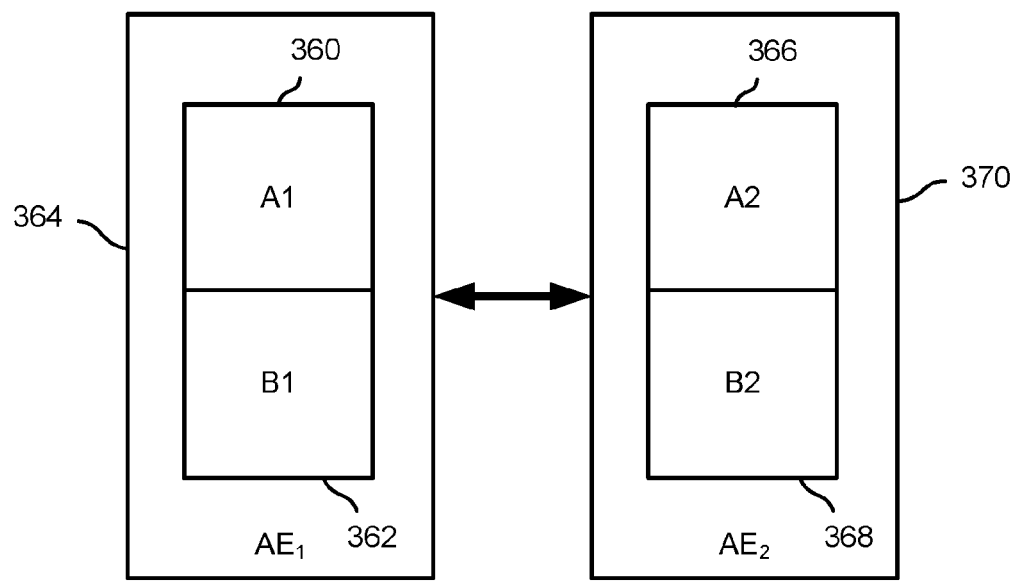
FIG. 3C is a block diagram illustrating an embodiment of a partitioned application environment.

FIG. 3C is a block diagram illustrating an embodiment of a partitioned application environment. In the example shown, techniques disclosed herein are used to integrate the respective functionality of two or more distinct applications; specifically, in the example shown, a first application "A" and a second application "B". A first application code 360 of the application A and a first application code 362 of the application B are shown to be executing in a first application environment partition 364, while a second application code 366 of the application A and a second application code 368 of the application B are executing in a second application environment partition 370. In various embodiments, at any given application environment (364, 370), an application hypervisor and/or partition manager and/or another component wrapped around and/or otherwise interfaced with the application code 360, 362 or 366, 368 running in that application environment provides a mechanism to enable information and/or commands to be communicated between the different applications, i.e., A and B in this example. For example, an application action initiated at the application A 366 as running in the environment 370 that has been sent, via a remoting service as described herein, to the corresponding application A 360 running in application environment 364 may in some embodiments be performed at least in part by communicating commands and/or information to/from the application B 362 running in the same environment 364. For example, an application hypervisor and/or application partition manager with which the applications 360 and 362 running in application environment 364 may recognize upon receiving a request to perform processing remotely that a configuration data, such as a policy, rule, setting, etc., requires that the application B 362 be used to perform at least part of the task, and/or an ancillary task, such as a logging, analytics, notification, or other task. In this way, the application B 362, 368 may participate in providing to a user of application A an experience associated with application A, in some embodiments and/or circumstances in a way that is transparent to the user and/or to the application A.

In some embodiments, techniques described herein may be used to facilitate simultaneous and/or otherwise collaborative use of application data. The application data may reside at and be modified by application code running in a server side application environment, for example, and an application hypervisor at the server may facilitate collaborative access to and/or modification of the application data, e.g., document or other content data, by multiple users, each interacting with the application via a user experience portion of the application executing in an application environment partition provided at a client system being used by that user. In various embodiments, an application hypervisor at the server may be configured to broker access to the content, including by resolving any conflicts between actions taken by the different users, e.g., by implementing conflict resolution logic, user-specified policies, etc.

Figure 4:
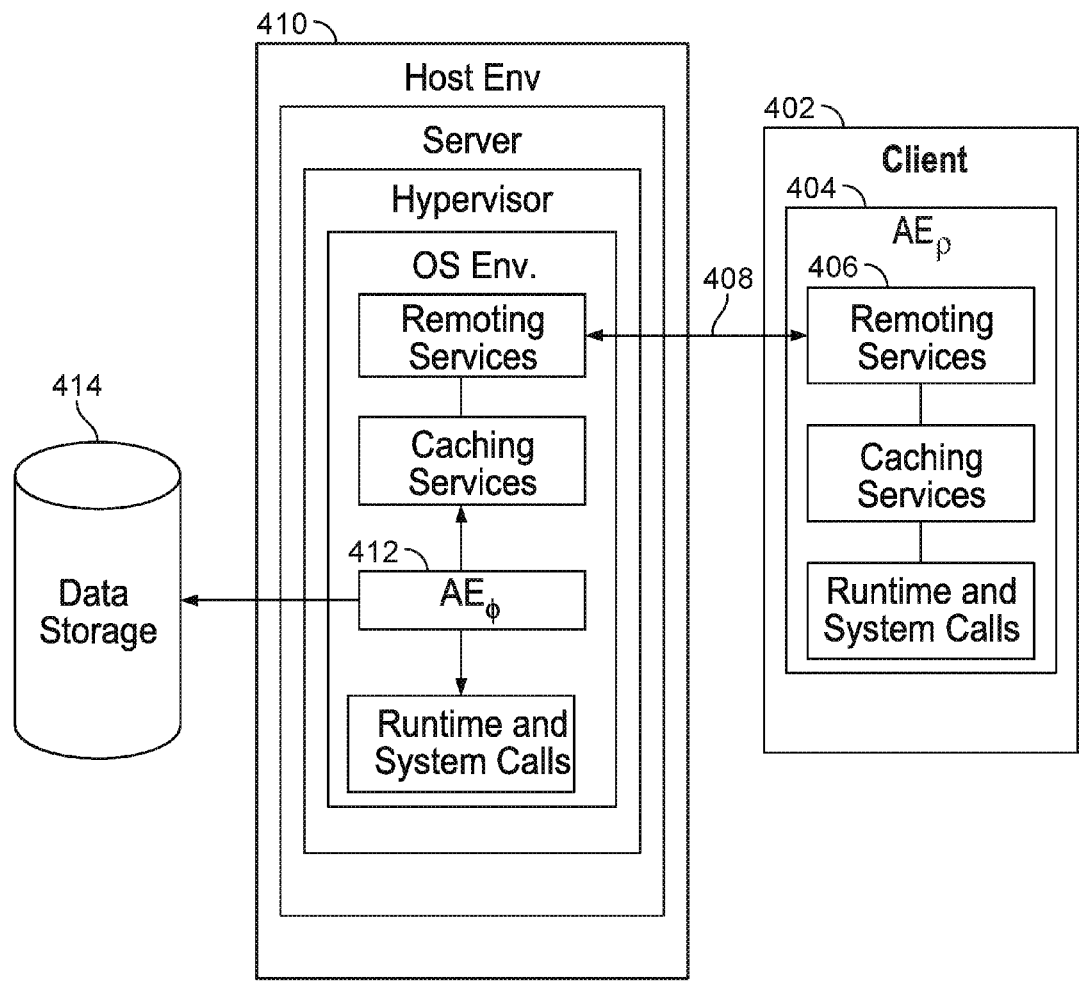
FIG. 4 is a block diagram illustrating an embodiment of a system in which an AE is split between a client and a remote server.

FIG. 4 is a block diagram illustrating an embodiment of a system in which an AE is split between a client and a remote server. FIG. 4 illustrates the simplest example where one AE ($AE_\rho$) 404, running on a client 402, is communicating via remoting services 406 and network communication 408 with a corresponding AE ($AE_\phi$) 412 running on a single remote node 410. In this example the ($AE_\phi$) 412 interacts with external systems and storage volumes 414. In either case of single or multiple nodes, the application in various embodiments is unaware of the changes occurring beneath its perceived AE.

Figure 5:
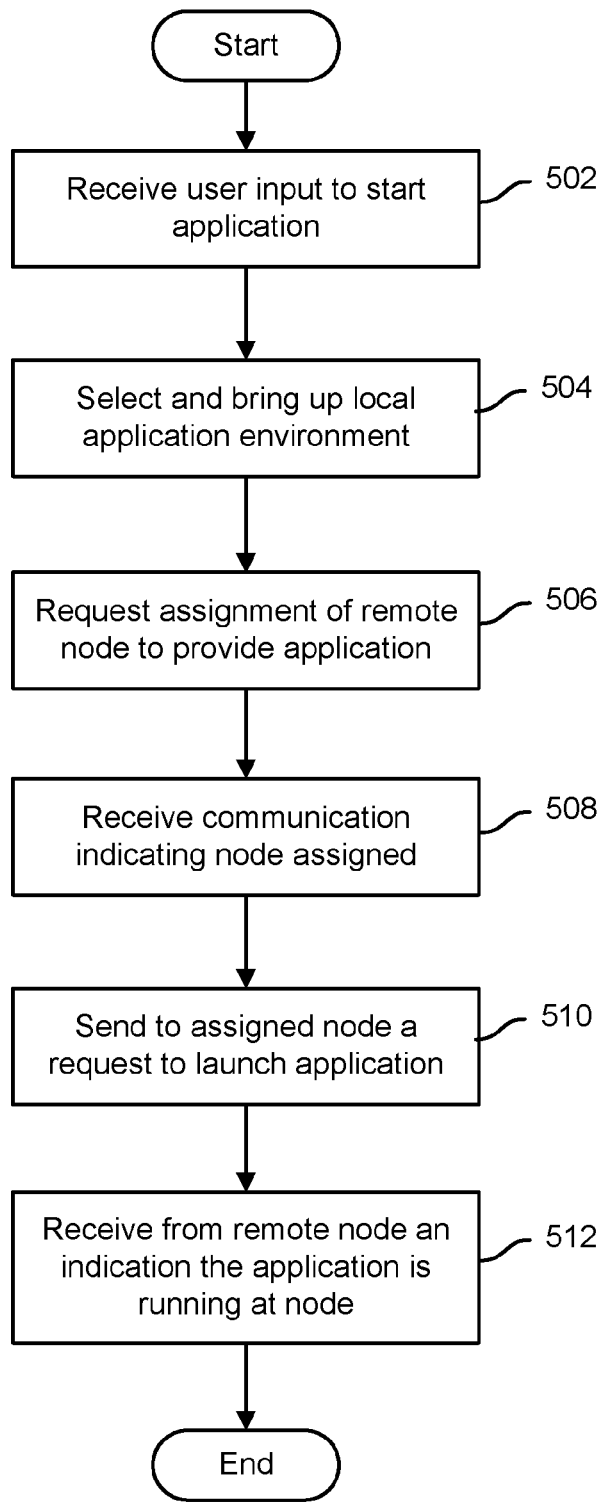
FIG. 5 is a flow chart illustrating an embodiment of a process to use a partitioned application environment to provide an application.

FIG. 5 is a flow chart illustrating an embodiment of a process to use a partitioned application environment to provide an application. In various embodiments, the process of FIG. 5 may be implemented in a user's client device, such as a mobile device or other client. In some embodiments, the process of FIG. 5 may be implemented at least in part by a management or other client application installed on the device to enable an application to be provided using a partitioned AE. In the example shown, a user input to start an application is received (502). For example, a user of a mobile device may select an icon or other representation associated with the application. An appropriate local application environment is selected and initialized (504). Assignment of a remote node to participate in providing the application, using an associated $AE_\phi$ at the remote node, is requested (506), for example from a dynamic load balancer. A responsive communication indicating a remote node that has been assigned to participate in providing the application is received (508). A request to launch the application is sent to the remote node that has been assigned (510). An indication is received from the remote node that the application is running at the remote node (512). While in the example illustrated in FIG. 5 a remote node is requested and assigned to participate in providing the application, in other embodiments a local node and/or a logical node or entity on a same host may be used to provide the application via a partitioned AE.

Figure 6:
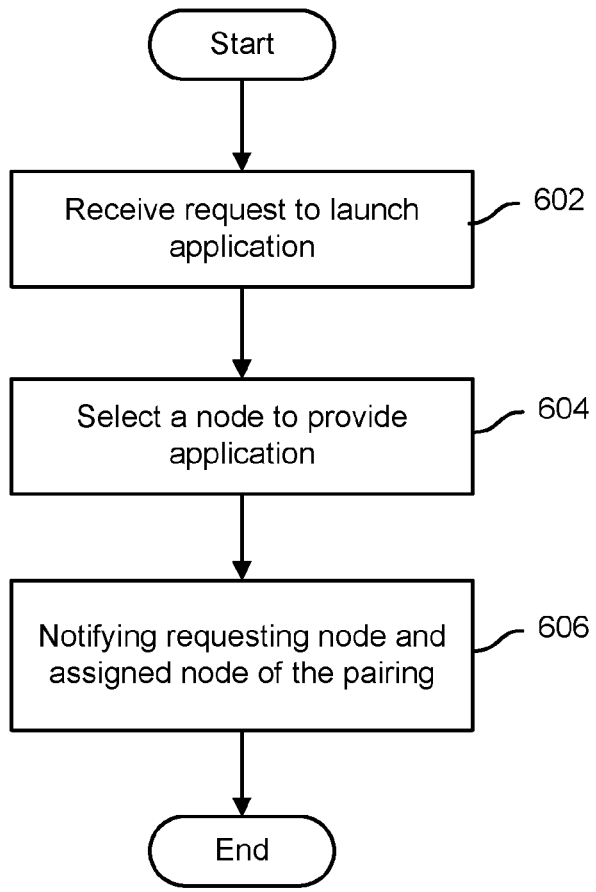
FIG. 6 is a flow chart illustrating an embodiment of a process to assign a node to participate in providing an application via a partitioned AE.

FIG. 6 is a flow chart illustrating an embodiment of a process to assign a node to participate in providing an application via a partitioned AE. In various embodiments, the process of FIG. 6 is implemented on a dynamic load balancing server or other load balancing node. In the example shown, a request to launch an application is received (602), for example from a client device or other host. A node is selected to participate in providing the application (604). Examples of criteria that may be used in various embodiments to select a node include, without limitation, one or more of information indicating which node(s) are able to provide an $AE_\phi$ required by the application; which node(s) have the application binary; the current workload and/or availability of each of a plurality of eligible nodes; geographic proximity; network topology; security or other requirements; quality of service requirements; etc. The requesting node and the assigned node are notified of the pairing (606). In various embodiments, one or more nodes may be assigned to participate in providing the application. In some embodiments, node assignments may shift over time while the application is being used. For example, a specific remote request (e.g., RPC or other call) from the client host at which the application user experience is being provided may be directed to a new, other, or different node than one originally assigned to participate in providing the application.

Figure 7:
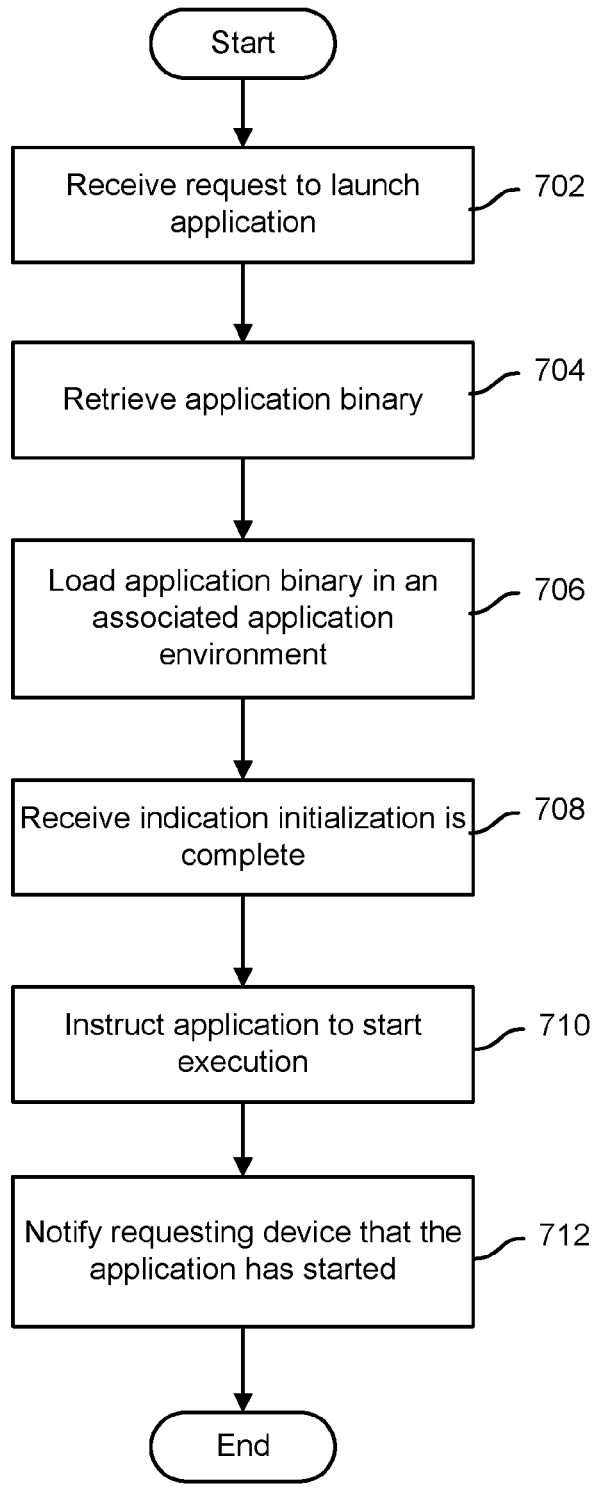
FIG. 7 is a flow chart illustrating an embodiment of a process to participate in providing an application via a partitioned AE.

FIG. 7 is a flow chart illustrating an embodiment of a process to participate in providing an application via a partitioned AE. In various embodiments, the process of FIG. 7 may be implemented by a node that has been assigned to participate in providing an application via a partitioned AE. In some embodiments, an application hypervisor or other entity running on the assigned node implements all or part of the process of FIG. 7. In the example shown, a request is received to launch an application (702). Application binary for the application is retrieved (704), e.g., from local and/or external storage. The application binary is loaded into an associated $AE_\phi$ (706). An indication is received that application initialization is completed (708). The application is instructed to start execution (710). The device from which the request to launch the application was received is notified that the application has started (712).

Figure 8:
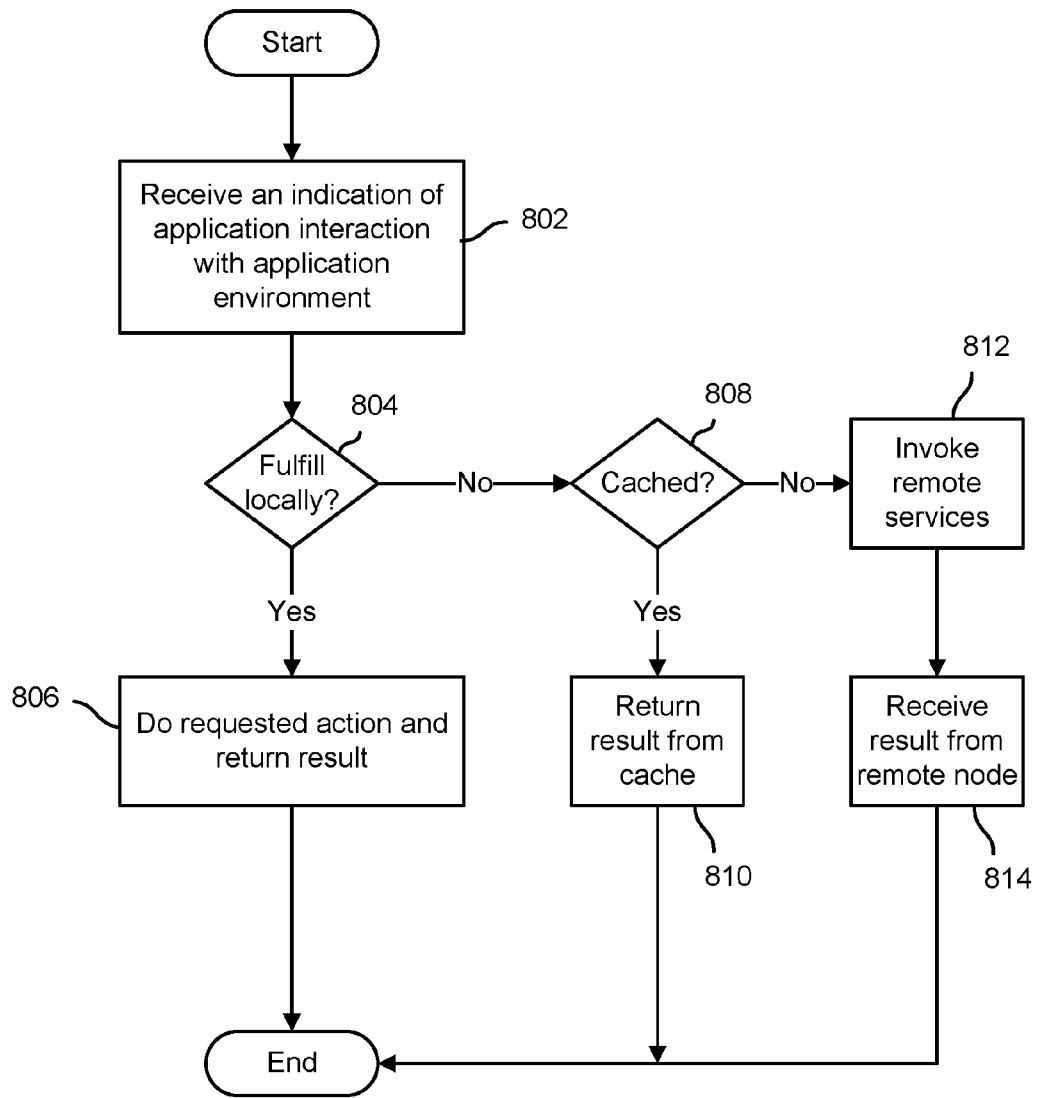
FIG. 8 is a flow chart illustrating an embodiment of a process to participate in providing an application using a partitioned application environment.

FIG. 8 is a flow chart illustrating an embodiment of a process to participate in providing an application using a partitioned application environment. In various embodiments, the process of FIG. 8 may be implemented by any node participating in providing the application, for example a client device ($AE_\rho$) or a server ($AE_\phi$). In the case of a server, for example, the process of FIG. 8 may be implemented by an application hypervisor or other entity. In the case of a mobile device or other client system, the process of FIG. 8 may be implemented by an application partition manager or other application software running on the device. In the example shown, an indication is received of an application interaction with its application environment (802). For example an API or other call to the application environment may be made by the application code executing in a local portion of a partitioned AE being used to provide the application. A determination is made whether to fulfill the request locally (804). In various embodiments, determinations whether to fulfill requests locally or via a remote request may be made based on a static configuration (e.g., user experience-related requests always fulfilled at client device, application business logic and/or data storage operations always performed at data center or other server), and/or dynamically, for example based on available resources, current workload, the scope and/or nature of resources available at respective nodes to fulfill requests, etc. If a determination is made to fulfill the request locally (804), the requested action is performed locally and a result returned to the application (806). If a determination is made not to perform the request locally (804), a cache is checked to determine if a requested resource is available in the cache (808). In some embodiments, the cache is checked only if the request is of a type such that a previously generated result or other resource may have been cached, for example in response to a previous call to a remote node. If the request can be fulfilled from the local cache (808), the request is satisfied from the cache (810). If request is not to be performed locally (804) and is not cached (808), remote services are invoked to fulfill the request (812), e.g., an RPC or other call to a remote node that is participating in providing the application via a partitioned AE. A result in received from the remote node (814) and returned to the calling application. The process of FIG. 8 is repeated for each call received.

Figure 9:
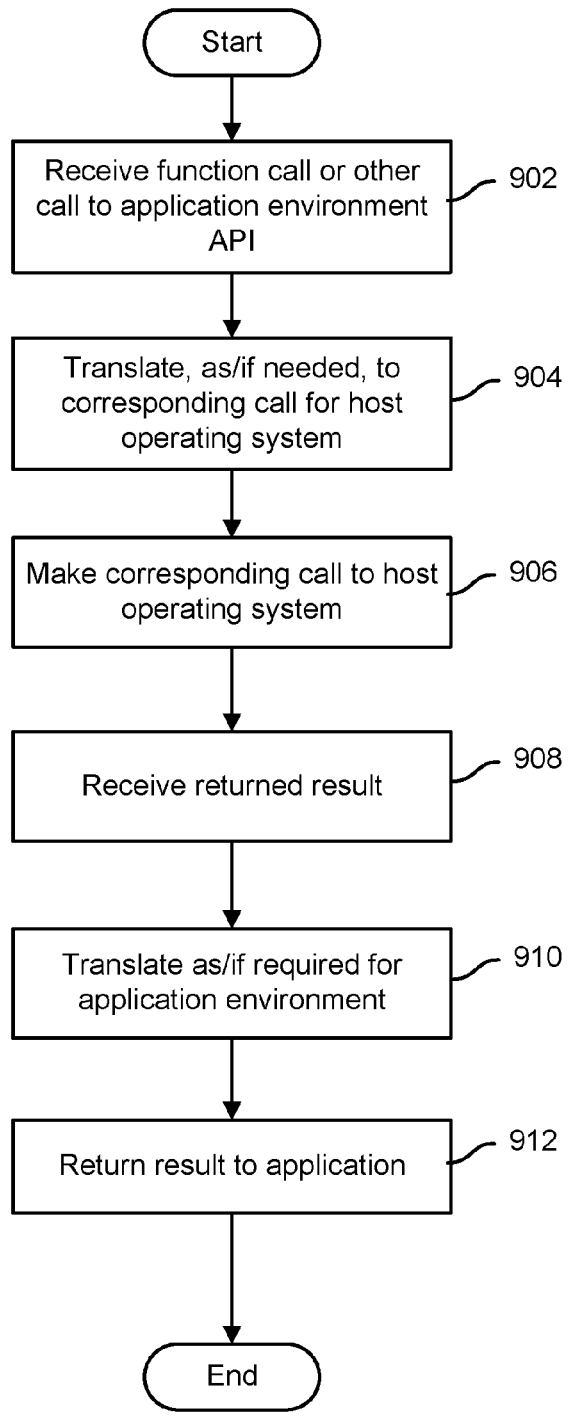
FIG. 9 is a flow chart illustrating an embodiment of a process to participate in providing an application via a partitioned application environment.

FIG. 9 is a flow chart illustrating an embodiment of a process to participate in providing an application via a partitioned application environment. In various embodiments, the process of FIG. 9 is implemented on a server configured to provide an AE associated with an application developed to run in an application environment associated with an operating system (OS) other than a native OS of the server. In some embodiments, the process of FIG. 9 may be implemented by an application hypervisor or other software running on the server, for example to emulate the AE in which the application was developed to run. In the example shown, a function call or other call by an application to an application environment, e.g. to an API associated with the application environment, is received (902). The call is translated, as/if needed, to a corresponding call of a native host or other operating system (904). The translated/corresponding call is made to the host operating system or, potentially in some cases, to an entity to which the operating system has delegated authority over a resource with which the call is associated (906). A returned result of the call is received (908). The result is translated, as/if required, to a corresponding form and/or content associated with the application environment that is being emulated (910). The result is returned to the calling application (912).

Figure 10:
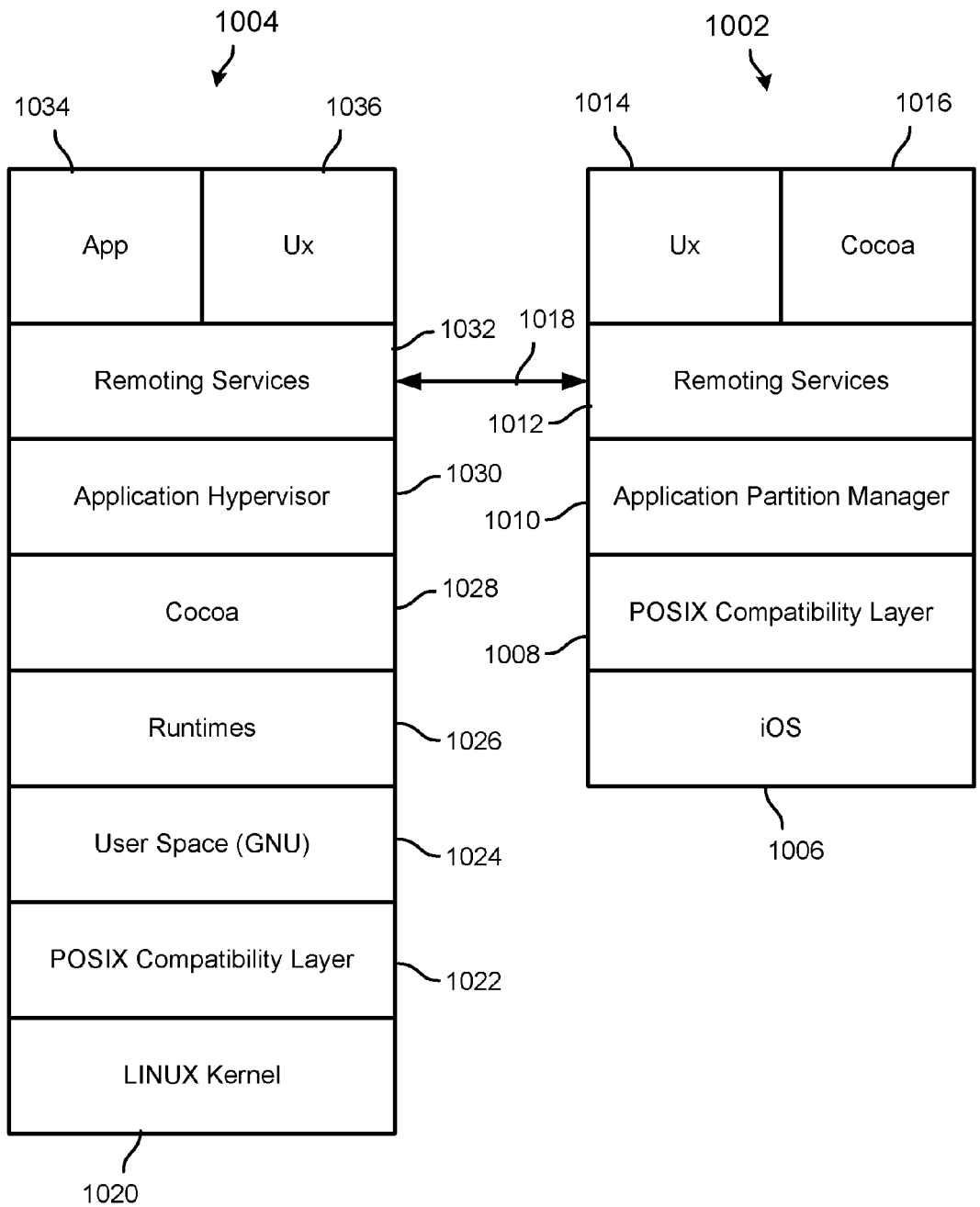
FIG. 10 is a block diagram illustrating an embodiment of a system to provide an application via a partitioned application environment.

FIG. 10 is a block diagram illustrating an embodiment of a system to provide an application via a partitioned application environment. In the example shown, a client device 1002, such as a mobile device, is in communication with a server 1004 via a communication link 1018, e.g., a mobile and/or other network. The client device 1002 includes an operating system 1006, in the example shown Apple Inc.'s® iOS™ operating system. A POSIX compatibility layer 1008 provides compatibility with other POSIX-compatible operating systems. An application partition manager 1010 comprises a client application configured to provide to a user of the client device 1002 access to one or more applications via a partitioned application environment. In various embodiments, application partition manager 1010 make or participates in making decisions as to which application calls to an associated AE are to be fulfilled locally and/or which are to be fulfilled via remote, interprocess, or other calls to another node participating in providing the application via a partitioned AE. Remoting services 1012 are used to communicate remote calls to other nodes participating in providing the application and/or to receive and properly route incoming calls from such remote nodes. A user experience (Ux) portion of application code 1014 executing on the client device 1002 is used to provide locally at the client device 1002 user experience aspects of the application experience, e.g., by generating and displaying display pages to display information and/or provide and receive interactions with a graphical user interface (GUI). A user interface library 1016, in this example Apple Inc.'s® Cocoa™, is provided and used to provide the application's user interface.

Referring further to FIG. 10, the server 1004 includes a LINUX (or other operating system) kernel 1020, a POSIX compatibility layer 1022, a user space (GNU) 1024, runtimes 1026, and user interface library 1028. An application hypervisor 1030 running on the aforementioned stack (1020, 1022, 1024, 1026, 1028) in various embodiments emulates an application environment (AE) with which the application is associated. In various embodiments, the application hypervisor 1030 includes software code that, when executed, makes remoting decisions with respect to the application. Server-side remoting services 1032 enable remote calls to be communicated to the client device 1002 and/or enables remote calls sent to the server 1004 to be received and processed. Application 1034 comprises application binary executing in an emulated AE provided at the server 1004. User experience elements 1036 enable certain user experience related processing to be performed at server 1004.

Figure 11:
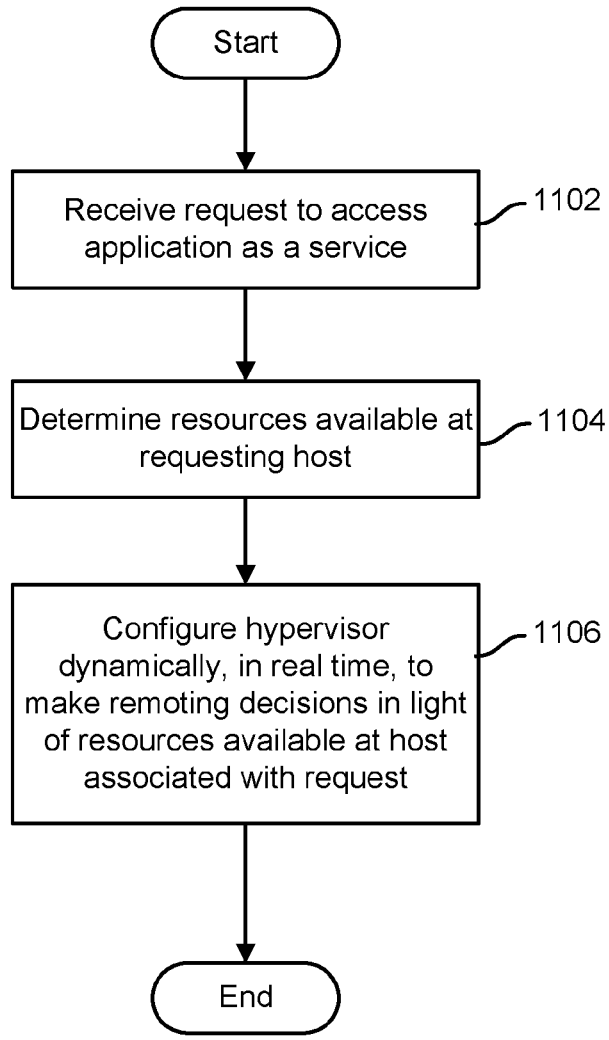
FIG. 11 is a flow chart illustrating an embodiment of a process to use a partitioned application environment to provide an application as a service.

FIG. 11 is a flow chart illustrating an embodiment of a process to use a partitioned application environment to provide an application as a service. In various embodiments, the process of FIG. 11 is used to provide access to and use of an application as a service, e.g., without downloading and/or otherwise installing at least a portion of application binary code on the client device used to access and use the application as a service. In some embodiments, a stub and/or application meta-information residing on and/or otherwise accessed by the client device may be used to identify and request access to and use of the application as a service. A request is received to access the application as a service (1102). Resources available at the requesting host are determined (1104). For example, a set of user experience or other services that may or may not be available at the requesting device are determined. In some embodiments, a device type and/or OS of the requesting device are determined. In some embodiments, a standards-based or other request is sent to the client device to obtain one or more of an inventory of resources available at the client, an inventory of software and/or versions thereof installed at the client, etc. An application hypervisor at the node servicing and/or assigned to service the request is configured, dynamically and in real time, to make remoting decisions with respect to the application in light of the resources determined to be available at the requesting client (1106).

Figure 12:
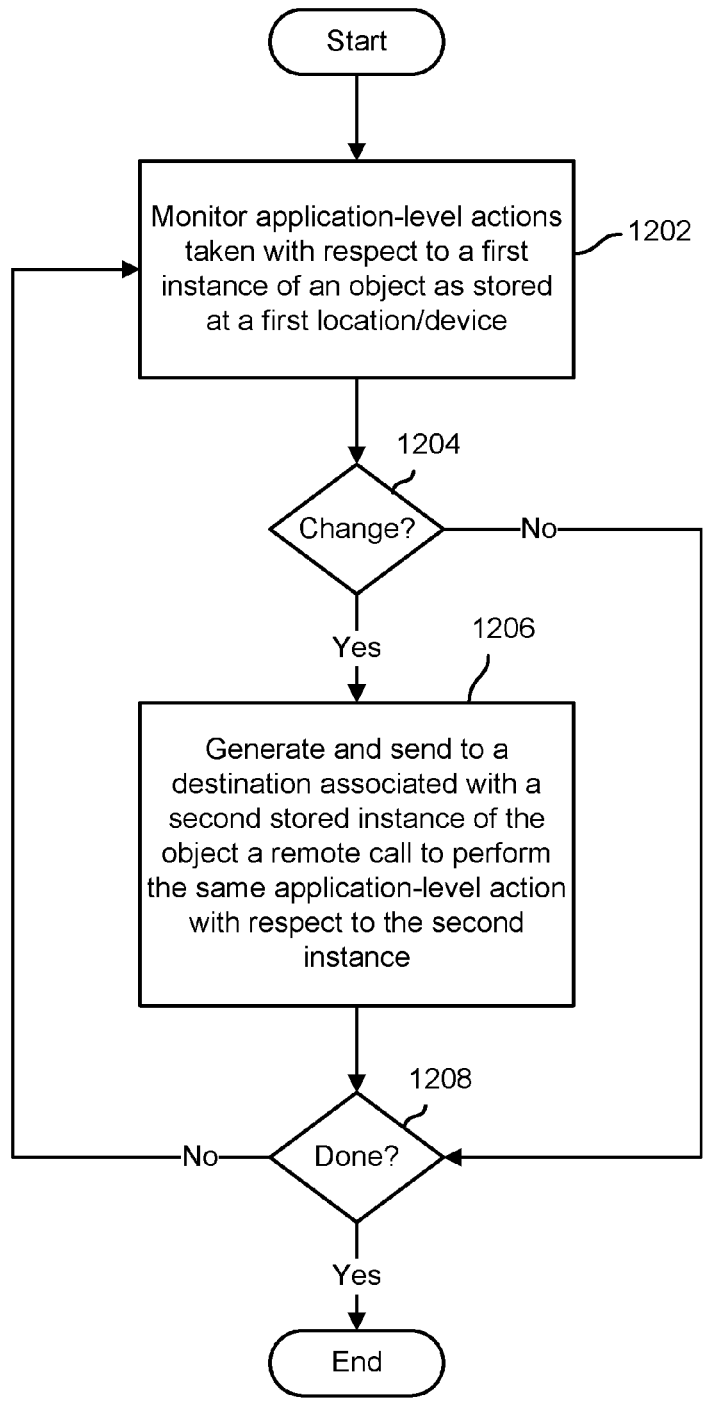
FIG. 12 is a flow chart illustrating an embodiment of a process to maintain synchronization of two or more stored instances of an object.

FIG. 12 is a flow chart illustrating an embodiment of a process to maintain synchronization of two or more stored instances of an object. In various embodiments, application code running across a partitioned application environment is used to maintain synchronization between two or more stored instances of an object, for example by replaying at a second stored instance of an object changes made using the application to a first stored instance of the object. In the example shown, application-level actions taken at a first node or other first location with respect to a first instance of a stored object are monitored (1202). For example, changes made locally to an instance of the object as stored locally are observed. As changes are detected (1204), the partitioned AE architecture and infrastructure disclosed here (see, e.g., FIG. 10) are used to generate and send to a destination at which a second instance of the object is stored a remote call to perform the same application-level action with respect to the second instance of the object (1206). Note that in the example illustrated in FIG. 12 remoting decisions are not made to determine which application calls are to be performed locally and which are to be performed remotely, as in a number of examples described above. Instead, application-level actions performed locally are monitored using the partitioned AE infrastructure disclosed herein, and remote calls are generated and sent to a destination node to cause the destination to repeat with respect to a second instance of the object stored locally at or otherwise associated with the destination the same actions that have been performed locally by the application with respect to the locally-stored instance of the object.

In various embodiments, applications may utilize some form of user identification tracking, for example iOS and Android have a Unique Device Identifier (UDID) for each physical device. This may raise security concerns about user tracking based on the physical device's identification. In various embodiments, application deployment as disclosed herein resolves this issue. Instead of providing a single fixed binary, a one-time application token is embedded in some embodiments into a small binary (under a megabyte) that is tied to the user installing the application. A token is uniquely generated for each thin application client that the user downloads to their device. Once the client is launched, it checks to see if a device token is found within the secure storage of the device. If it is not found, then the client provides its embedded application token to an authentication server, which generates a unique device token which is returned to the client, and stored in the secure storage on the device. This device token is used to securely identify and authenticate the device to all services going forward.

In some embodiments of this authentication model, the user initially sends a request to the Enterprise Application Store (EAS) to download the thin client application. The EAS then retrieves the template thin application binary from data storage. It then generates a unique "Application Token" for the request and injects it, along with other useful data, into the binary. The thin application binary is digitally signed, then returned to the initial request for the application, and loaded onto the user's device. Once the application is launched, the application will check the secure storage for a "Secure Token". If a "Secure Token" is not found, then the application will send the user's credentials plus the embedded "Application Token" to the assigned server over a secure connection. The server then validates the user based on the user's credentials as well as validates the "Application Token". If the "Application Token" is valid, the server then generates a "Secure Token" and stores this for future processing. The server then sends this "Secure Token" back to the application over secure connection. The application then stores this "Secure Token" in the device's secure storage for future processing requests. The application then interacts with the server as needed.

The benefit of this token authentication in some embodiments is that it securely identifies enrolled devices as belonging to a user without relying on system provided credentials, which are available to other applications on the device, preventing many potential spoofing attacks against the system.

A partitioned application environment and an infrastructure and techniques to provide same have been disclosed. In various embodiments, processing to realize an application and associated functionality may be performed across two or more AE partitions, which present themselves to the application, with the aid of an application hypervisor on a server side and/or an application partition manager on a client device, as a single, homogeneous application environment. Use of such an architecture to provide access to and use of mobile or other applications as a service, and/or to maintain synchronization between multiple instances of a stored application object, such as a file, have been described.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing an application, comprising:
receiving a request from a first application associated with a first application environment partition in which the first application is running;
determining, based at least in part on one or more considerations, including security, whether to fulfill the request at least in part via a call to a node at which a second application associated with a second application environment partition is running at the node, wherein to fulfill the request based on security, the second application processes application data that is unavailable to be processed by the first application and provides the first application with a result of the processing, wherein the second application environment partition at the node is related to the first application environment partition such that the first application and the second application cumulatively function to provide at least in part a single application, wherein the request associated with the first application environment partition comprises a call to an Application Programming Interface (API) of an application environment of the single application for which the first application environment partition and the second application environment partition are partitions; and
in response to determining to fulfill the request at least in part at the node, sending to the node, a call associated with the request.

2. The method of claim 1, wherein the call to the node comprises a remote procedure call (RPC).

3. The method of claim 1, wherein the call to the node comprises an inter-process communication (IPC).

4. The method of claim 1, wherein the determination of whether to fulfill the request via a call to the node is made at least in part by an entity configured to monitor calls by the first application and for each of at least a subset of the calls to determine whether the call is to be fulfilled locally or via a call to the node.

5. The method of claim 1, further comprising:
receiving a second request associated with the first application environment partition in which the first application is running; and
determining to fulfill the second request locally.

6. The method of claim 5, wherein fulfilling the second request locally includes invoking a user interface library or other local user interface resource.

7. The method of claim 5, wherein fulfilling the second request locally includes translating the second request into a form associated with an operating system of a platform on which the first application environment partition is being provided.

8. The method of claim 1, wherein the first application environment partition in which the first application is running and the second application environment partition in which the second application is running at the node corresponds to a partitioned application environment which are presented to the single application as a single, homogeneous application environment.

9. The method of claim 1, wherein the determination whether to fulfill the request via the call to the node is made based at least in part on a static partitioning of responsibility between a local application environment and a corresponding application environment at the node.

10. The method of claim 1, wherein the determination whether to fulfill the request via the call to the node is made dynamically at the time the request is received.

11. The method of claim 10, wherein the determination whether to fulfill the request via the call to the node is made dynamically based at least in part on one or more of a resource provided locally, a resource available at the node, a current local workload, and a current workload at the node.

12. The method of claim 1, wherein the node comprises one of a plurality of nodes each of which is configured to run an application associated with the first application in an application environment partition provided at that node.

13. The method of claim 1, further comprising receiving an indication to launch the first application.

14. The method of claim 13, further comprising sending in response to the indication a request to assign a participant to participate in providing the first application.

15. The method of claim 14, further comprising receiving an indication that the node has been assigned to participate in providing the first application.

16. The method of claim 15, further comprising sending to the node a request to launch the second application in the second application environment partition provided at the node.

17. The method of claim 1, wherein determining whether to fulfill the request at least in part via a call to a node at which the second application associated with the second application environment partition is running at the node includes sending to the node a request to perform with respect to a first instance of an object stored at or otherwise associated with the node a modification performed by the second application with respect to a second instance of the object stored at a second storage location.

18. The method of claim 1, wherein access to and use of the first application is provided to a user of a client device as a service; and the second application environment partition in which the second application is running is provided at the node and one or more other nodes other than the client device.

19. The method of claim 1, wherein the determination whether to fulfill the request at least in part via a call to the node at which the second application associated with the second application environment partition is running at the node is based at least in part on a determination that a result or other resource associated with the request is not available in a local cache.

20. The method of claim 1, further comprising:
receiving from the node a result or other resource provided by the node in response to the call; and
storing the result or other resource in a local cache.

21. The method of claim 1, wherein:
the single application comprises the first application associated with the first application environment partition included in an application environment that is partitioned into a plurality of application environment partitions; and
the node is configured to respond to the call at least in part by facilitating communication at the node between the second application as running at the node in the second application environment partition of the partitioned application environment and another application running at the node in the another partition of the application environment.

22. The method of claim 1, wherein the first application and the second application correspond to different instantiations of a same application.

23. The method of claim 1, wherein the first application environment partition and the second application environment partition are instantiated in connection with providing a homogenous application environment to the single application.

24. The method of claim 1, wherein the one or more considerations further include a capability, a resource availability, and a resource usage.

25. A system, comprising:
a communication interface; and
a processor coupled to the communication interface and configured to:
receive a request from a first application associated with a first application environment partition in which the first application is running;
determine, based at least in part on one or more considerations, including security, whether to fulfill the request at least in part via a call to a node at which a second application associated with a second application environment partition is running at the node, wherein to fulfill the request based on security, the second application processes application data that is unavailable to be processed by the first application and provides the first application with a result of the processing, wherein the second application environment partition at the node is related to the first application environment partition such that the first application and the second application cumulatively function to provide at least in part a single application, wherein the request associated with the first application environment partition comprises a call to an Application Programming Interface (API) of an application environment of the single application for which the first application environment partition and the second application environment partition are partitions; and
in response to determining to fulfill the request at least in part at the node, send to the node via the communication interface, a the call associated with the request.

26. The system of claim 25, wherein the determination of whether to fulfill the request via a call to the node is made at least in part by an entity configured to monitor calls by the first application and for each of at least a subset of the calls to determine whether the call is to be fulfilled locally or via a call to the node.

27. The system of claim 25, wherein the first application environment partition in which the first application is running and the second application environment partition in which the second application is running at the node corresponds to a partitioned application environment which are presented to the single application as a single, homogeneous application environment.

28. The system of claim 25, wherein the one or more considerations further include a capability, a resource availability, and a resource usage.

29. A computer program product embodied in a tangible, non-transitory computer readable storage medium, and comprising computer instructions for:
    receiving, a request from a first application associated with a first application environment partition in which the first application is running;
    determining, based at least in part on one or more considerations, including security, whether to fulfill the request at least in part via a call to a node at which a second application associated with a second application environment partition is running at the node, wherein to fulfill the request based on security, the second application processes application data that is unavailable to be processed by the first application and provides the first application with a result of the processing, wherein the second application environment partition at the node is related to the first application environment partition such that the first application and the second application cumulatively function to provide at least in part a single application, wherein the request associated with the first application environment partition comprises a call to an Application Programming Interface (API) of an application environment of the single application for which the first application environment partition and the second application environment partition are partitions; and
    in response to determining to fulfill the request at least in part at the node, sending to the node, a call associated with the request.

30. The computer program product of claim 29, wherein the first application environment partition in which the first application is running and the second application environment partition in which the second application is running at the node corresponds to a partitioned application environment which are presented to the single application as a single, homogeneous application environment.

31. The computer program product of claim 29, wherein the one or more considerations further include a capability, a resource availability, and a resource usage.

\* \* \* \* \*